US010391513B2

(12) United States Patent
Zhou et al.

(10) Patent No.: US 10,391,513 B2
(45) Date of Patent: Aug. 27, 2019

(54) SEALANT DISPENSING APPARATUS

(71) Applicants: Boe Technology Group Co., Ltd., Beijing (CN); Hefei Xinsheng Optoelectronics Technology Co., Ltd., Anhui (CN)

(72) Inventors: Jideng Zhou, Beijing (CN); Ge Wang, Beijing (CN); Chengying Cao, Beijing (CN); Peng Li, Beijing (CN); Huanyu Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 16 days.

(21) Appl. No.: 15/712,321

(22) Filed: Sep. 22, 2017

(65) Prior Publication Data

US 2018/0207670 A1 Jul. 26, 2018

(30) Foreign Application Priority Data

Jan. 23, 2017 (CN) .......................... 2017 2 0086285

(51) Int. Cl.

*B05C 1/02* (2006.01)
*G02F 1/13* (2006.01)
*G02F 1/1339* (2006.01)

(52) U.S. Cl.

CPC ............ *B05C 1/027* (2013.01); *G02F 1/1303* (2013.01); *G02F 1/1339* (2013.01)

(58) Field of Classification Search

CPC ........ G02F 1/13; G02F 1/1333; G02F 1/1313; G02F 1/1303; B05C 1/16; B05C 1/006; B05C 1/027; B05C 11/105; B05C 5/0204; B05C 5/0233; B05C 5/0225; B05C 5/0237; B05C 5/0291

USPC ........ 222/167–168, 325–327, 478, 484–485, 222/488, 526

See application file for complete search history.

(56) References Cited

U.S. PATENT DOCUMENTS 2,802,604 A * 8/1957 Ebberts .................. B65D 35/40 222/207
3,294,292 A * 12/1966 Adams .................... B01F 13/02 222/429
3,353,721 A * 11/1967 Love ...................... A45D 24/22 132/114

(Continued)

*Primary Examiner* — Paul R Durand
*Assistant Examiner* — Andrew P Bainbridge
(74) *Attorney, Agent, or Firm* — Calfee, Halter & Griswold LLP

(57) ABSTRACT

A sealant dispensing apparatus includes a rotatable injection cartridge for loading a sealant, having a plurality of outlets distributed from a periphery to a center with respect to a rotation axis of the injection cartridge; and a nozzle assembly in fluid communication with the injection cartridge, including at least two sub-nozzles arranged in a line. The outlet of the injection cartridge closer to the center of the injection cartridge is in communication with the sub-nozzle of the nozzle assembly closer to a first end of the line, and the outlet of the injection cartridge closer to the periphery of the injection cartridge is in communication with the sub-nozzle of the nozzle assembly closer to a second end of the line. The first end is opposite to the second end.

13 Claims, 5 Drawing Sheets

(56) References Cited

U.S. PATENT DOCUMENTS

| | | | | | |
|---|---|---|---|---|---|
| 5,010,841 | A * | 4/1991 | Stewart | B05C 5/0208 | 118/113 |
| 5,542,574 | A * | 8/1996 | Stern | A47G 19/183 | 222/137 |
| 5,881,920 | A * | 3/1999 | Seager | B65D 81/325 | 222/137 |
| 5,947,337 | A * | 9/1999 | Worth | B67C 3/284 | 141/198 |
| 5,975,098 | A * | 11/1999 | Yoshitani | B08B 3/02 | 134/148 |
| 6,681,957 | B1 * | 1/2004 | Green | B05C 17/00553 | 222/135 |
| 6,716,478 | B2 * | 4/2004 | Kitano | B05C 5/0208 | 118/300 |
| 6,732,888 | B1 * | 5/2004 | Smiley | B65D 1/32 | 222/129 |
| D521,863 | S * | 5/2006 | Davis | D9/447 | |
| 7,459,176 | B2 * | 12/2008 | Sakurada | G02B 5/201 | 118/323 |
| 7,469,639 | B2 * | 12/2008 | Yoo | B05C 1/0813 | 101/170 |
| 8,118,414 | B2 * | 2/2012 | Tsuchiya | B05D 1/26 | 347/55 |
| 8,947,621 | B2 * | 2/2015 | Tanihara | G02F 1/1303 | 349/117 |
| 9,352,561 | B2 * | 5/2016 | Harjee | B41J 2/07 | |
| 9,445,518 | B2 * | 9/2016 | Yoon | G02F 1/1303 | |
| 9,731,875 | B2 * | 8/2017 | Wilson | B65D 47/127 | |
| 2002/0088393 | A1 * | 7/2002 | Kitano | B05C 5/0208 | 118/305 |
| 2003/0100824 | A1 * | 5/2003 | Warren | A61B 5/0066 | 600/407 |
| 2006/0132666 | A1 * | 6/2006 | Niiya | G02F 1/1333 | 349/41 |
| 2016/0306205 | A1 * | 10/2016 | Zang | G02F 1/1339 | |

* cited by examiner

SEALANT DISPENSING APPARATUS

CROSS REFERENCE TO RELATED APPLICATIONS

This application claims the benefit of Chinese Patent Application No. 201720086285.4 filed on Jan. 23, 2017, the entire disclosure of which is incorporated herein by reference.

TECHNICAL FIELD

The present disclosure relates to the technical field of manufacture of liquid crystal panels, and more particularly to a sealant dispensing apparatus.

BACKGROUND

The sealant dispensing process is an important step in the manufacture of liquid crystal panels. By dispensing a sealant on the periphery of the panel, the color film substrate is bonded to the array substrate and a liquid crystal cell is formed in the panel. The thickness of the liquid crystal cell can be controlled by controlling the dispensing amount of the sealant.

The conventional sealant dispensing apparatus typically includes an injection cartridge having only one outlet. The sealant is applied to the panel via the outlet. In the cell-alignment process, the inner side and outer side of the sealant are exposed to different environments. Specifically, the inner side of the sealant is in contact with the liquid crystal, and the outer side of the sealant is exposed to air or vacuum. Thus, the pressures at both sides are different. This will result in the height of the outer side of the sealant being lower than the height of the inner side of the sealant, and ultimately in an uneven gap around the panel. The uneven gap usually leads to defects such as yellowing, leakage of light, unevenness of luminance (Mura), and the like at the periphery of the liquid crystal panel.

SUMMARY

Embodiments of the present disclosure provide a sealant dispensing apparatus that seeks to alleviate, mitigate or eliminate one or more of the defects as described above.

A sealant dispensing apparatus is proposed which comprises: a rotatable injection cartridge for loading a sealant, having a plurality of outlets distributed from a periphery to a center with respect to a rotation axis of the injection cartridge; and a nozzle assembly in fluid communication with the injection cartridge, comprising at least two sub-nozzles arranged in a line. The outlet of the injection cartridge closer to the center of the injection cartridge is in communication with the sub-nozzle of the nozzle assembly closer to a first end of the line, and the outlet of the injection cartridge closer to the periphery of the injection cartridge is in communication with the sub-nozzle of the nozzle assembly closer to a second end of the line, such that the outlets distributed outwardly from the center of the injection cartridge are in turn communicated with the sub-nozzles distributed from the first end to the second end, respectively. The first end is opposite to the second end.

In some embodiments, the nozzle assembly comprises two sub-nozzles arranged in a line. One of the sub-nozzles is in communication with the outlet of the injection cartridge located at the periphery, and the other with the outlet of the injection cartridge located at the center.

In some embodiments, the nozzle assembly comprises three sub-nozzles arranged in a line. The sub-nozzle located at the first end of the line is in communication with the outlet of the injection cartridge located at the periphery, the sub-nozzle located at the second end of the line is in communication with the outlet of the injection cartridge located at the center, and the nozzle located in the middle is in communication with the outlet of the injection cartridge between the periphery and the center.

In some embodiments, the injection cartridge is configured to rotate after being filled with the sealant and before dispensing the sealant via the nozzle assembly.

In some embodiments, the sealant dispensing apparatus further comprises an outer cartridge disposed around the injection cartridge and the nozzle assembly.

In some embodiments, the outer cartridge is secured.

In some embodiments, the outlets of the injection cartridge have respective recesses independent from each other to collect the sealant in the vicinity of the respective outlets.

In some embodiments, the injection cartridge is integrally formed with the nozzle assembly.

In some embodiments, the injection cartridge is formed separately from the nozzle assembly, and the injection cartridge is rotatably coupled to the nozzle assembly.

In some embodiments, the nozzle assembly is arranged such that the sub-nozzle that is not disposed at a center of the line has an annular opening centered at the rotation axis of the injection cartridge in a surface at which the nozzle assembly is coupled to the injection cartridge.

In some embodiments, the dispensing apparatus is provided with a positioning mark for positioning a position of the nozzle assembly after rotation of the injection cartridge.

In some embodiments, the injection cartridge is configured to rotate at a rotational speed ranging from 500 RPM to 2000 RPM.

In some embodiments, the injection cartridge is provided, at an end of the injection cartridge opposite to the nozzle assembly, with a cartridge cover and an air pipe connector provided on the cartridge cover.

In some embodiments, the injection cartridge and the nozzle assembly are made of stainless steel.

In some embodiments, the plurality of outlets comprises a plurality of outlets located at the periphery.

In some embodiments, the plurality of outlets located at the periphery are evenly distributed around the rotation axis of the injection cartridge.

In some embodiments, the plurality of outlets comprises a plurality of outlets located between the periphery and the center.

In some embodiments, the plurality of outlets located between the periphery and the center are evenly distributed around the rotation axis of the injection cartridge.

BRIEF DESCRIPTION OF THE DRAWINGS

The accompanying drawings are included to provide a further understanding of the embodiments and are incorporated in and form a part of this specification. The drawings illustrate the embodiments and together with the description serve to explain the principles of the present disclosure. Other embodiments and many desirable advantages of the embodiments will be readily appreciated since they become better understood by reference to the following detailed description. The elements of the drawings are not necessarily to scale in proportion to each other. Like reference numerals refer to like parts.

DETAILED DESCRIPTION

In the following detailed description, reference is made to the accompanying drawings, which form a part of the detailed description, and the disclosure is described by way of illustrative and specific embodiments in which the present disclosure may be practiced. In this context, directional terms such as "top", "bottom", "left", "right", "upper", "lower", and the like are used in reference to the orientation of the depicted figures. Since the components of the embodiments may be positioned in several different orientations, directional terms are used for purposes of illustration, and not for purposes of restriction. It is to be understood that other embodiments may be utilized or logical changes may be made without departing from the scope of the present disclosure. The following detailed description is therefore not to be taken in a limiting sense, and the scope of the present disclosure is defined by the appended claims.

Figure 1:
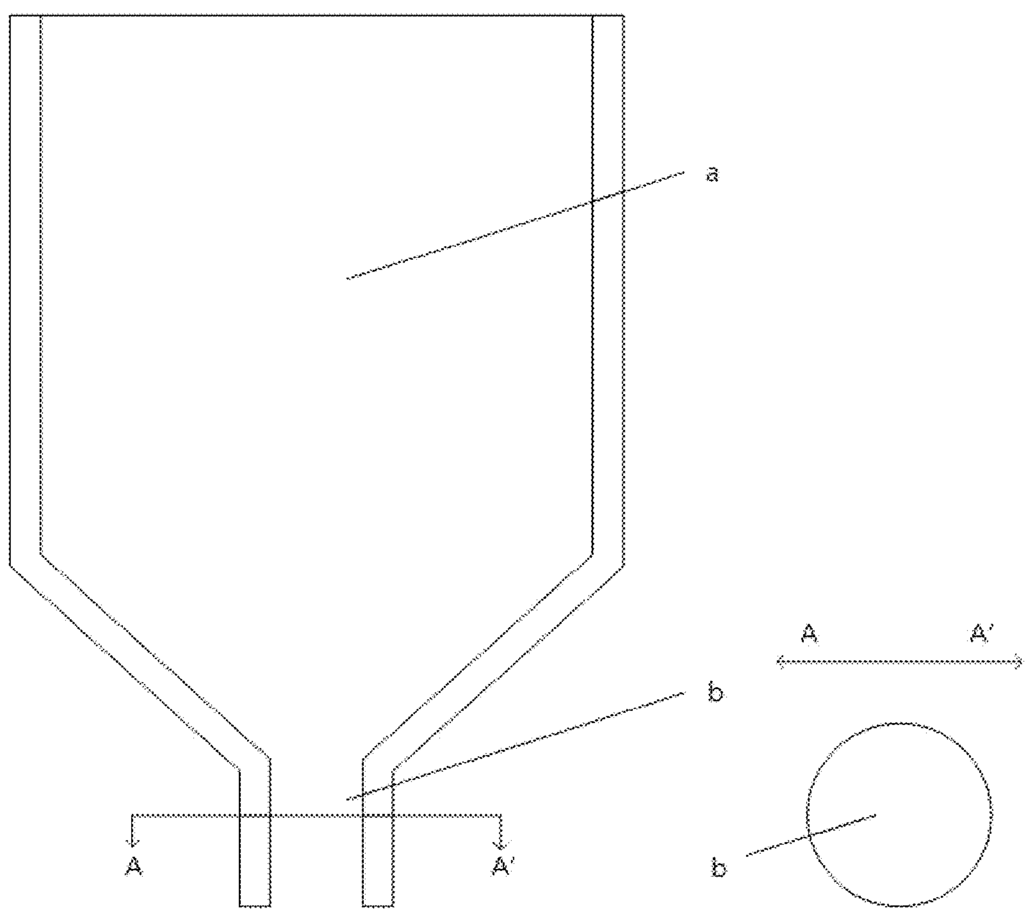
FIG. 1 shows a schematic diagram of a sealant dispensing apparatus according to the prior art.

FIG. 1 is a schematic diagram of a sealant dispensing apparatus according to the prior art. Referring to FIG. 1, the prior art dispensing apparatus comprises an injection cartridge "a" and a nozzle "b" that are integrally formed. The nozzle b has only one outlet. A cross-sectional view of the nozzle b taken along line A-A' is shown at the lower right corner of FIG. 1. The sealant is filled in the injection cartridge a, and the injection cartridge a is fixed. The sealant is then uniformly discharged from the single nozzle b under pressure to be applied on the substrate so that the sealant applied to the substrate will have a uniform height. However, since the pressures at the inner and outer sides of the sealant are different as described above, the sealant will be lower at the inner side and higher at the outer sides, resulting in defects such as leakage of light and the like.

Figure 2:
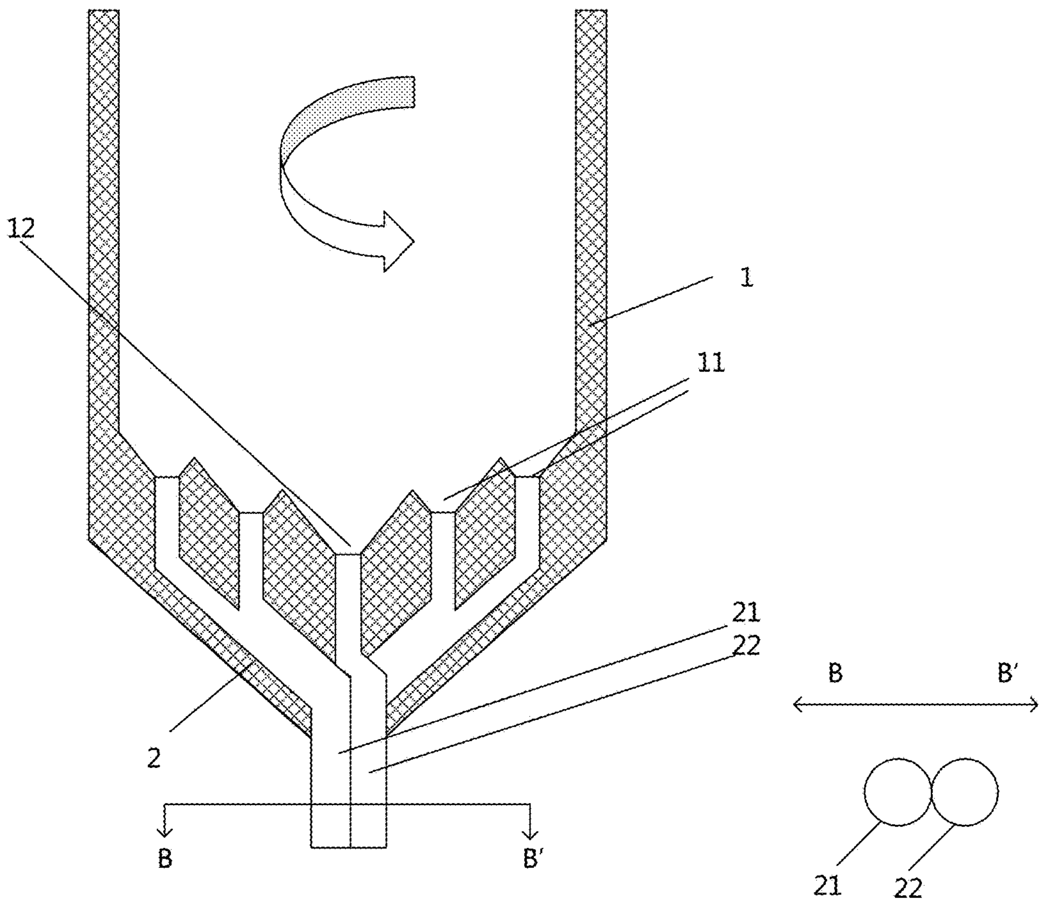
FIG. 2 shows a schematic diagram of a sealant dispensing apparatus according to a first embodiment of the present disclosure.

FIG. 2 is a schematic diagram of a sealant dispensing apparatus according to a first embodiment of the present disclosure. Referring to FIG. 2, the sealant dispensing apparatus comprises a rotatable injection cartridge 1 for loading a closure gum. The injection cartridge 1 can rotate in the direction indicated by the arrow. Accordingly, the injection cartridge 1 has a plurality of outlets, such as peripheral outlets 11 and a central outlet 12, distributed from the periphery to the center. In an alternative example, the respective outlets 11, 12 of the injection cartridge 1 have respective recesses independent from each other, to collect the sealant in the vicinity of the respective outlets. This improves the separation of the sealant with different sizes of silicon balls.

The sealant dispensing apparatus further comprises a nozzle assembly 2 in fluid communication with the injection cartridge 1. The nozzle assembly 2 includes two sub-nozzles 21, 22 arranged in a line, as shown in a cross-sectional view taken along line B-B' at the lower right corner of FIG. 2. The two sub-nozzles 21, 22 are close to each other and are separated from each other, thereby forming two dispensing ports. Although only two peripheral outlets 11 located at the left side of the figure are shown as being connected to the sub-nozzle 21 in FIG. 2, the two peripheral outlets 11 at the right side of the figure are substantially also connected to the sub-nozzles 21 (via a channel at the back side of the sub-nozzles 21, 22 not shown FIG. 2). The flow rate at which the sealant flows to the sub-nozzles can be adjusted by adjusting the projection area of the recesses provided in each outlet on the nozzle assembly 2 to balance the flow rate of each of the sub-nozzles.

After being filled with the sealant, the injection cartridge 1 rotates, for example, at a rotational speed of about 500 to 2000 rpm. Of course, any other appropriate speed is also contemplated. With the rotation of the injection cartridge 1, the silicon balls in the sealant are regularly arranged from the center to the outside of the injection cartridge 1 in accordance with the sizes of the silicon balls under a centrifugal force. That is, the size of the silicon balls at the center of the injection cartridge 1 is the smallest, and the farther way from the center of the injection cartridge 1, the larger the size of the silicon balls is. Accordingly, the small silicon balls located at the center of the injection cartridge 1 will flow to the sub-nozzle 22 through the outlet 12 located at the center of the injection cartridge 1, and are applied to the panel via the sub-nozzle 22. At the same time, the larger silicon balls located at the periphery of the injection cartridge 1 will flow to the sub-nozzle 21 through the outlet 11 located at the periphery of the injection cartridge 1, and are applied to the panel via the sub-nozzle 21. Thus, the sealant finally applied to the panel has a height difference in the direction perpendicular to the panel, that is, the side of the sealant facing the outside of the panel is higher than the side of the sealant facing the inside of the panel. Such an initial height difference can compensate for the difference in height due to the difference in internal and external stresses received by the sealant in the future, thereby improving the display defects of the display panel due to defects in the sealant.

In this embodiment, the injection cartridge 1 and the nozzle assembly 2 may be made of, for example, a stainless steel material or any other suitable material. The injection cartridge barrel 1 and the nozzle assembly 2 may be integrally formed or secured (e.g., welded) together after being separately formed so that the nozzle assembly 2 will also follow when the injection cartridge 1 rotates. In operation, the injection cartridge 1 is configured to rotate after being filled with the sealant and before dispensing the sealant via the nozzle assembly 2. After the rotation for a certain period of time, the silicon balls in the sealant are redistributed, the injection cartridge 1 is stopped, and then the applying process is performed. At the time of applying, it is necessary to ensure that the sealant with smaller silicon balls is applied on the inside of the panel. Therefore, the nozzle assembly 2 is required to be correctly oriented, i.e., the sub-nozzle 22 in FIG. 2 should be directed toward the inside of the panel. To this end, a positioning mark may be provided on the sealant dispensing apparatus for positioning the position of the nozzle assembly 2 after the rotation of the injection cartridge 1. For example, a mark is made on the sub-nozzle 22 to indicate its position. Alternatively, a locking device (not shown) is provided on the sealant dispensing apparatus which locks the orientation of the nozzle assembly 2 after the injection cartridge 1 stops rotating.

Figure 3:
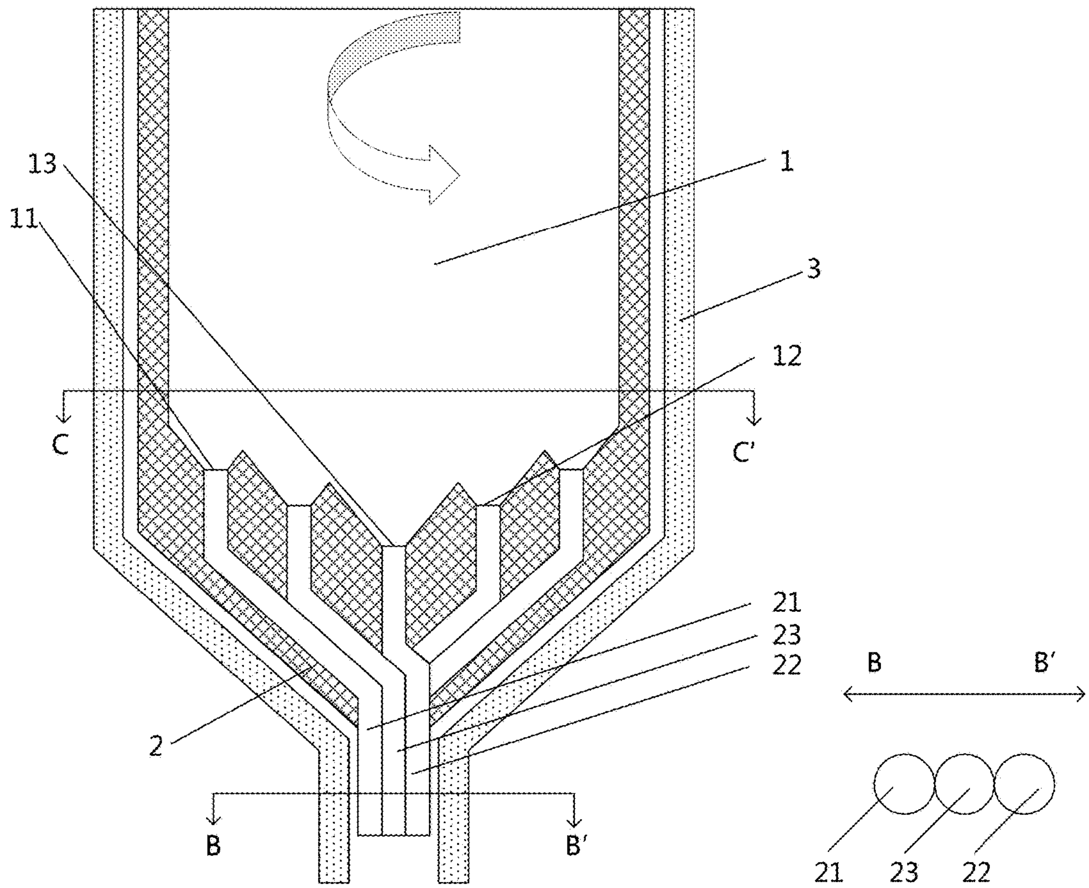
FIG. 3 shows a schematic diagram of a sealant dispensing apparatus according to a second embodiment of the present disclosure.

In various embodiments of the present disclosure, the rotation of the injection cartridge 1 can be accomplished by a motor. Of course, it can also be achieved by any other appropriate technology. FIG. 3 shows a schematic diagram of a sealant dispensing apparatus according to a second embodiment of the present disclosure. Referring to FIG. 3, this embodiment differs from the embodiment shown in FIG. 2 in that the nozzle assembly 2 now has three sub-nozzles and an outer cartridge 3 is provided around the injection cartridge 1 and the nozzle assembly 2. The outer cartridge 3 serves to protect the injection cartridge 1 and the nozzle assembly 2. In an alternative example, the outer cartridge 3 is secured. That is, it is not rotatable about the rotation axis of the injection cartridge 1.

In the second embodiment, the nozzle assembly 2 has three sub-nozzles. A cross-sectional view of the nozzle assembly 2 taken along line B-B' is shown at the lower right corner of FIG. 3. As shown, three sub-nozzles 21, 22, 23 are arranged in a line. The sub-nozzle 21 is located at the far left of the figure, the sub-nozzle 22 is located at the rightmost of the figure, and the sub-nozzle 23 is located in the middle. Accordingly, the injection cartridge 1 has an outlet 11 located at the periphery of the injection cartridge, an outlet 13 located at the center of the injection cartridge, and an outlet 12 between the periphery and the center of the injection cartridge.

Figure 4:
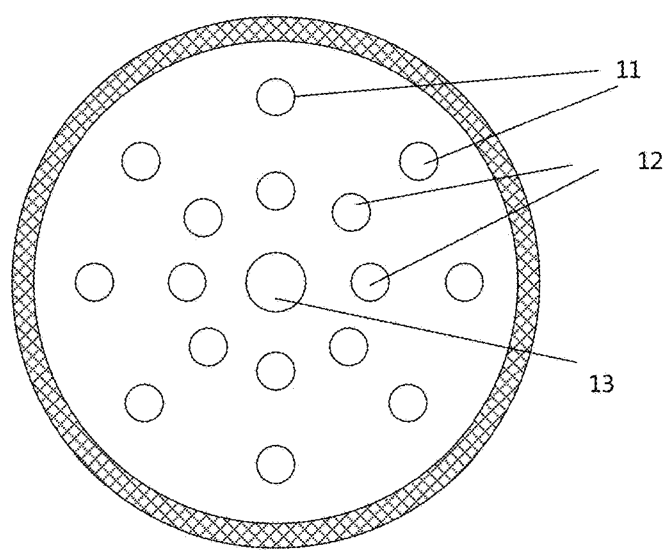
FIG. 4 schematically shows a top view of the injection cartridge viewed from the position of line C-C' in FIG. 3.

FIG. 4 schematically shows a top view of the injection cartridge 1 viewed from the position of the line C-C' of FIG. 3. In the illustrated example, there are provided a plurality of outlets 11 at the periphery of the injection cartridge 1 and a plurality of outlets 12 between the periphery and the center of the injection cartridge 1. The plurality of outlets 11 are evenly distributed around the rotation axis of the injection cartridge 1, and the plurality of outlets 12 are evenly distributed around the rotation axis of the injection cartridge 1. Of course, the outlets 11, 12, 13 are not limited to the configuration as shown in FIG. 4, and may have other suitable layouts. The outlet(s) 11 is/are in fluid communication with the sub-nozzle 21, the outlet(s) 12 is/are in fluid communication with the sub-nozzle 23, and the outlet 13 is in fluid communication with the sub-nozzle 22.

The dispensing apparatus of the second embodiment may be such that silicon balls with a larger size flow out from the sub-nozzle 21, silicon balls with a medium-sized from the sub-nozzle 23, and silicon balls with a smaller size from the sub-nozzle 22. Thereby, the applied sealant can form three steps from high to low.

This improves the accuracy of the sealant application and thus the ability of the applied sealant to be adaptive to the ambient pressure. Of course, the nozzle assembly 2 may have three or more sub-nozzles as required to further improve the accuracy of the application.

In an alternative example, a drive mechanism (not shown) for driving the injection cartridge 1 to rotate may be located between the injection cartridge 1 and the outer cartridge 3.

Figure 5:
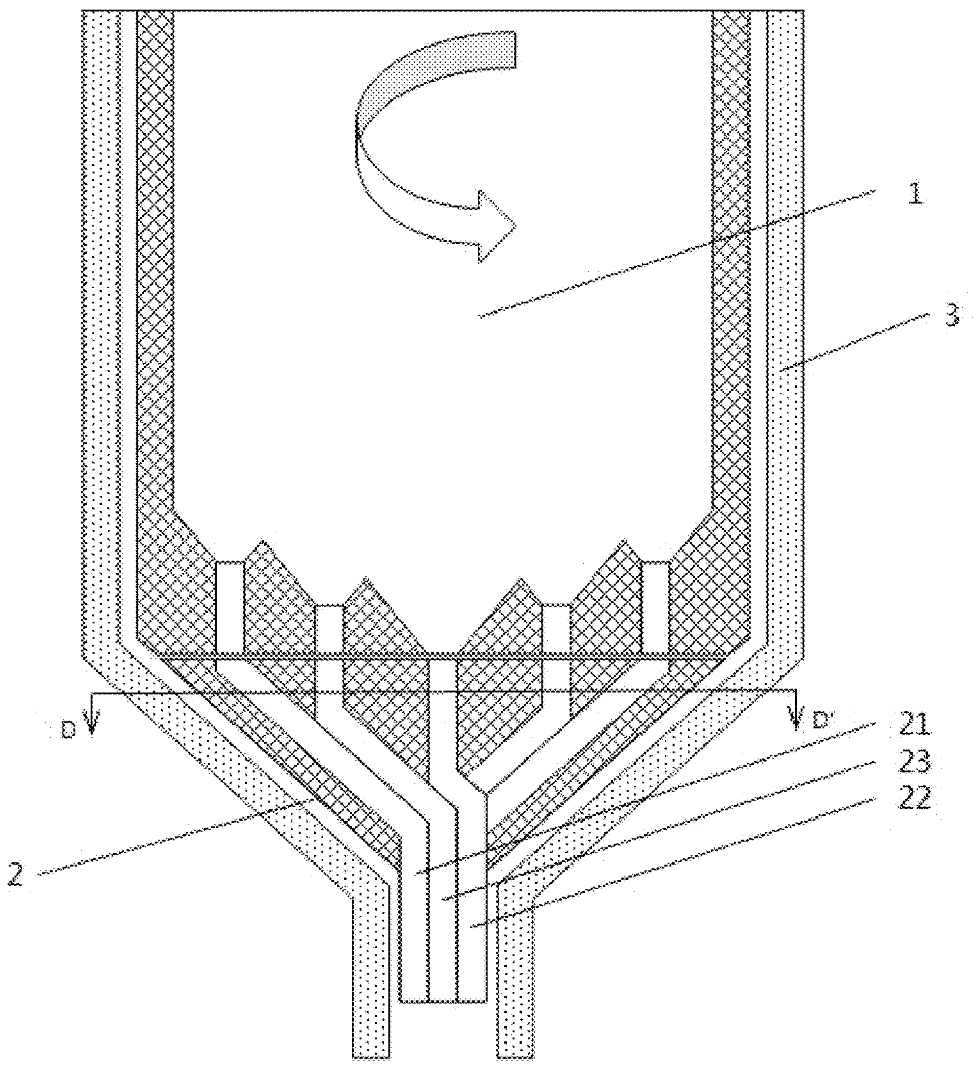
FIG. 5 shows a schematic diagram of a sealant dispensing apparatus according to a third embodiment of the present disclosure.

FIG. 5 shows a schematic diagram of a sealant dispensing apparatus according to a third embodiment of the present disclosure. Referring to FIG. 5, the third embodiment differs from the second embodiment in that the injection cartridge 1 is separated from the nozzle assembly 2 and the injection cartridge 1 is rotatably coupled to the nozzle assembly 2 to receive the sealant from the injection cartridge 1. In the third embodiment, the nozzle assembly 2 does not need to rotate with the injection cartridge 1, but remains stationary. This may be advantageous because the application can be performed with the nozzle assembly 2 while the injection cartridge 1 is rotating. A sealing mechanism may be provided where the injection cartridge barrel 1 and the nozzle assembly 2 are coupled to each other.

Figure 6:
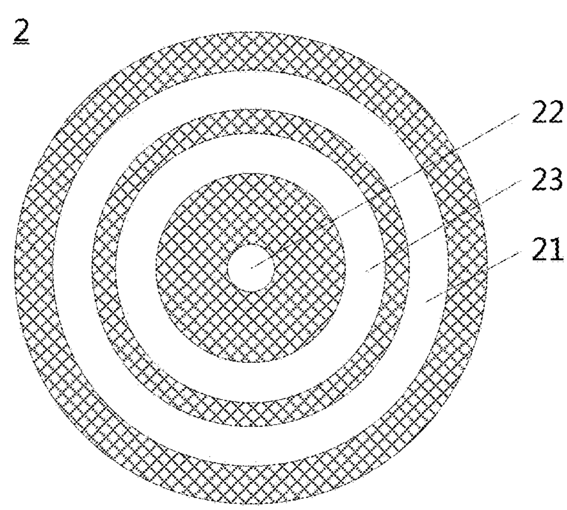
FIG. 6 schematically shows a cross-sectional view of the nozzle assembly taken along line D-D' in FIG. 5.

FIG. 6 schematically shows a cross-sectional view of the nozzle assembly 2 taken along line D-D' in FIG. 5. Referring to FIG. 6, the nozzle assembly 2 is arranged such that the sub-nozzles (the sub-nozzles 21 and 22 in the example of FIG. 6) which are not arranged at the center of the nozzle assembly 2 have annular openings centered at the rotation axis of the injection cartridge 1 in a surface at which the nozzle assembly 2 is coupled to the injection cartridge 1. This allows the sub-nozzles 21 and 22 to receive the sealant from the injection cartridge 1 even in the case where the injection cartridge 1 is rotated.

Figure 7:
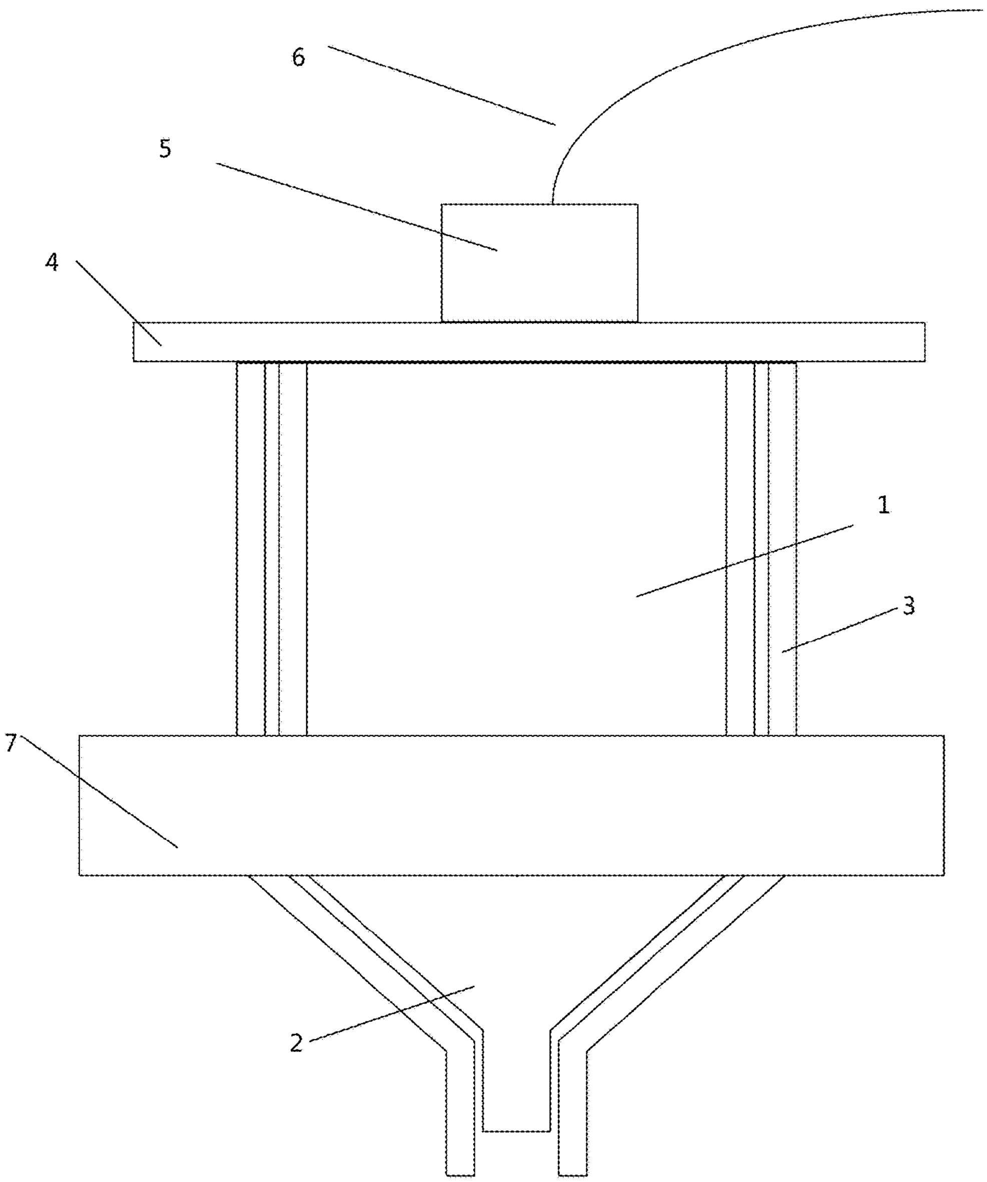
FIG. 7 shows a schematic diagram of an overall structure of a sealant dispensing apparatus according to an embodiment of the present disclosure.

FIG. 7 shows a schematic diagram of an overall construction of a sealant dispensing apparatus according to an embodiment of the present disclosure. The dispensing apparatus operates with the air pressure principle. As shown in FIG. 7, the sealant dispensing apparatus includes an injection cartridge 1, a nozzle assembly 2, an outer cartridge 3, a cartridge cover 4, an air pipe connector 5 provided on the injection cartridge cover 4, an air pipe 6, and an outer cartridge fixing portion 7. The injection cartridge 1 is filled with a sealant. The air pipe connector 5 is connected to a gas output device such as an air pump through the air pipe 6. After the high-speed rotation of the injection cartridge 1 is performed, the gas is injected into the injection cartridge 1 through the air pipe connector 5, and the sealant is extruded through the nozzle 2 to perform the application.

The specific embodiments of the present application have been described above, but the scope of the present application is not limited thereto. Variations or substitutions readily conceived of by those skilled in the art within the scope of the technology disclosed in this application are intended to be encompassed within the scope of the present application. Accordingly, the scope of the present application should be defined by the appended claims.

In the description of the present application, the azimuth or positional relationship indicated by the terms "up", "down", "inside", "outside", etc. is based on the azimuth or positional relationship shown in the drawings only for ease of description of the present application, rather than indicating or implying that the device or element referred to must have a specific orientation, or is constructed and operated in a particular orientation, and therefore cannot be construed as limiting the present application. The word "comprising" does not exclude the presence of elements or steps not listed in the claims. The word "a" or "an" preceding a component does not exclude the presence of multiple such elements. The mere fact that certain measures are recited in mutually different dependent claims does not indicate that the combination of these measures cannot be used to advantage. Any reference signs in the claims should not be construed as limiting the scope.

What is claimed is:

1. A sealant dispensing apparatus, comprising:

a rotatable injection cartridge for loading a sealant, the injection cartridge having a plurality of outlets distributed from a periphery to a center with respect to a rotation axis of the injection cartridge; and a nozzle assembly in fluid communication with the injection cartridge, the nozzle assembly comprising at least two sub-nozzles arranged in a line, wherein the outlet of the injection cartridge closer to the center of the injection cartridge is in communication with the sub-nozzle of the nozzle assembly closer to a first end of the line, and the outlet of the injection cartridge closer to the periphery of the injection cartridge is in communication with the sub-nozzle of the nozzle assembly closer to a second end of the line, such that the outlets distributed outwardly from the center of the injection cartridge communicate with the sub-nozzles distributed from the first end to the second end, respectively, the first end being opposite to the second end.

2. The sealant dispensing apparatus of claim 1, wherein the nozzle assembly comprises two sub-nozzles arranged in a line, wherein one of the sub-nozzles is in communication with the outlet of the injection cartridge located at the periphery and the other of the sub-nozzles is in communication with the outlet of the injection cartridge located at the center.

3. The sealant dispensing apparatus of claim 1, wherein the nozzle assembly comprises three sub-nozzles arranged in a line, wherein the sub-nozzle located at the first end of the line is in communication with the outlet of the injection cartridge located at the periphery, the sub-nozzle located at the second end of the line is in communication with the outlet of the injection cartridge located at the center, and the nozzle located in the middle is in communication with the outlet of the injection cartridge between the periphery and the center.

4. The sealant dispensing apparatus of claim 1, wherein the injection cartridge is configured to rotate after being filled with the sealant and before dispensing the sealant via the nozzle assembly.

5. The sealant dispensing apparatus of claim 1, further comprising a housing disposed around the injection cartridge and the nozzle assembly.

6. The sealant dispensing apparatus of claim 5, wherein the housing is secured.

7. The sealant dispensing apparatus of claim 1, wherein the outlets of the injection cartridge have respective recesses independent from each other to collect the sealant in the vicinity of the respective outlets.

8. The sealant dispensing apparatus of claim 1, wherein the injection cartridge is integrally formed with the nozzle assembly.

9. The sealant dispensing apparatus of claim 1, wherein the dispensing apparatus is provided with a positioning mark for positioning a position of the nozzle assembly after rotation of the injection cartridge.

10. The sealant dispensing apparatus of claim 1, wherein the injection cartridge is configured to rotate at a rotational speed ranging from 500 RPM to 2000 RPM.

11. The sealant dispensing apparatus of claim 1, wherein the injection cartridge is provided, at an end of the injection cartridge opposite to the nozzle assembly, with a cartridge cover and an air pipe connector provided on the cartridge cover.

12. The sealant dispensing apparatus of claim 1, wherein the injection cartridge and the nozzle assembly are made of stainless steel.

13. The sealant dispensing apparatus of claim 1, wherein the plurality of outlets comprises a plurality of outlets located between the periphery and the center.

* * * * *